(No Model.) 2 Sheets—Sheet 1.

F. M. RYAN.
CAR COUPLING.

No. 498,575. Patented May 30, 1893.

Witnesses,
J. H. Nourse
J. A. Bayless

Inventor,
Frank M. Ryan
By Dewey & Co.
Attys

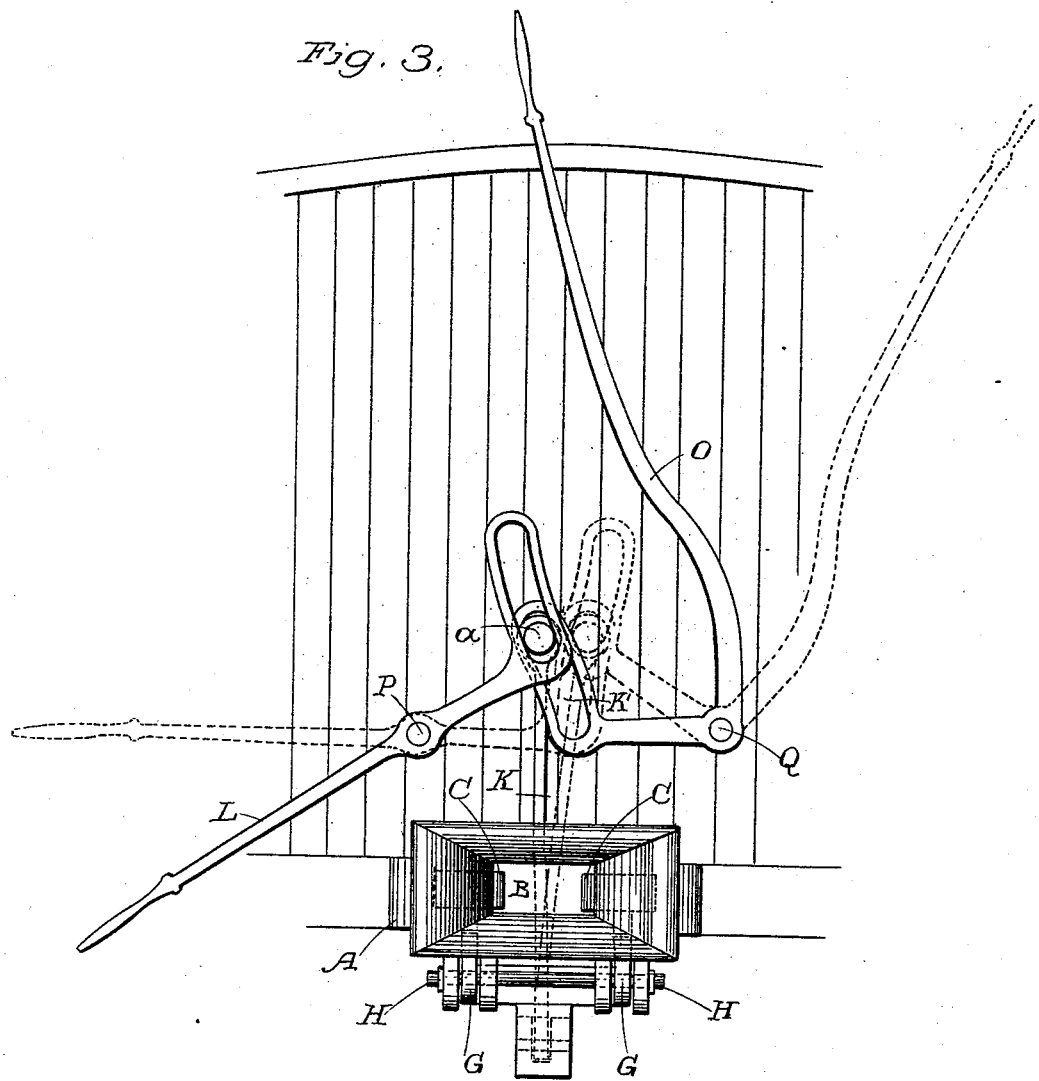

UNITED STATES PATENT OFFICE.

FRANK M. RYAN, OF SAN FRANCISCO, CALIFORNIA, ASSIGNOR OF ONE-HALF TO WALTER T. SMITH, OF SAME PLACE.

CAR-COUPLING.

SPECIFICATION forming part of Letters Patent No. 498,575, dated May 30, 1893.

Application filed March 22, 1893. Serial No. 467,184. (No model.)

*To all whom it may concern:*

Be it known that I, FRANK M. RYAN, a citizen of the United States, residing in the city and county of San Francisco, State of California, have invented an Improvement in Car-Couplings; and I hereby declare the following to be a full, clear, and exact description of the same.

My invention relates to a novel coupling for cars.

It consists in certain details of construction which will be more fully explained by reference to the accompanying drawings, in which—

Figure 1:
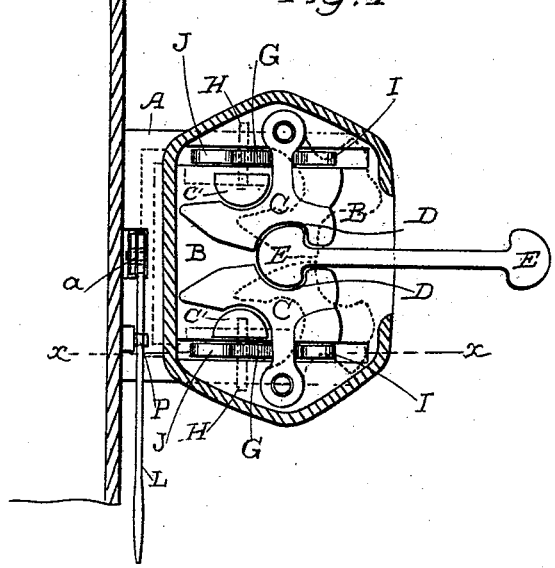
Figure 2:
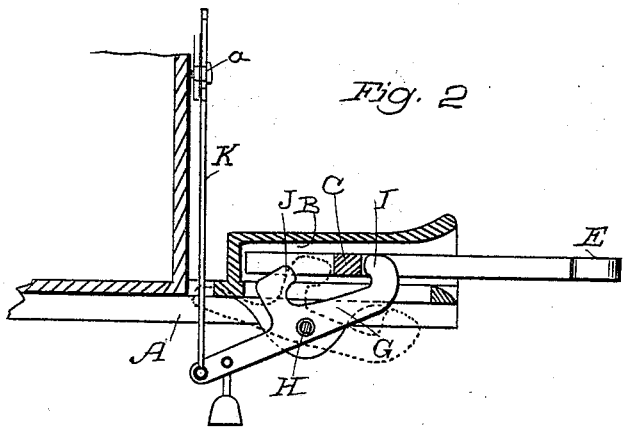

Figure 1 is a horizontal section of my car coupling through the chamber B. Fig. 2 is a vertical section of the same. Fig. 3 is an end elevation of the end of a car, showing coupling and the levers for working the jaws.

In this invention I have only shown so much of the end of a car as will illustrate the device.

A is the draw-bar having upon its outer end a shallow horizontal chamber B within which are pivoted the link holding jaws or levers C, the pivot pins being upon the outer ends of the levers, while the inner ends which move in contact with each other when the levers are turned about their pivot pins, are slotted or chambered as shown at D to receive the head E of the coupling bar.

The levers C are forced backward when the head of a coupling bar is introduced, and as they turn about their pivot pins, the opening D closes about the head E and locks the bar in place. Cushions or springs C' of any suitable description are fitted behind the levers C to relieve the shock caused by the cams coming violently together or by suddenly forcing the levers backward.

When the coupling bar is in place it is retained by vertically fulcrumed levers G, pivoted as shown at H, and moving in vertical planes about their pivot pins. The front and rear ends of these levers have hooks I and J respectively, and behind these hooks, the levers are brought together and have a single weighted or spring actuated extension rearwardly by which the front ends are normally thrown upwardly.

The operation of the coupling is as follows:—When the rear portion of the levers G is raised, the rear hooks J are thrown upward and forward against the rear portion of the horizontal coupling levers C, thus turning these levers about their fulcrum pins and forcing them forward so as to open the coupling jaws. The device is retained in this position with the jaws open until they are forced back by the entrance of the coupling link which, striking the rear of the opening, forces the jaws to turn about their fulcrum pins, and the front portion of the opening is closed so as to retain the head of the coupling bar in place. This movement forces the jaws J backward, the levers G rotating about their fulcrum pins, and as the jaws J move backward and downward, the jaws I are correspondingly thrown upward and stand in front of the shanks of the levers C and lock them in place so as to prevent the jaws which contain the head of the coupling bar from being opened by any pull which may take place. The coupling remains in this condition as long as it is desired to retain the cars together, but in order to uncouple the cars, I have shown an arrangement of levers connected with the rear extension of the locking levers G. This connection is made as follows:—K is a rod, the lower end of which is attached to the rear extension of the levers G. This rod extends upwardly just in front of the car, and has a pin $a$ extending horizontally from its upper end for the attachment of the levers L and O. The lever L extends from the side of the car inwardly and is fulcrumed as shown at P. The inner end of this lever has a curved slotted link formed upon it which fits over the pin $a$ of the rod K. The other lever O extends upwardly to the top of the car and is fulcrumed as shown at Q, a little at one side, with the short arm extending essentially at right angles with the long vertical arm, and this short arm has a corresponding link K' formed upon its end. The two links on the levers are curved as shown, the convexity of the slot and curve being toward the fulcrum of the lever in each case, and both links fit over the pin $a$ as shown. By this construction, whenever the operator is standing upon the ground, he can employ the lever L to place the parts in position for coupling or to uncouple the cars at will, but if he be upon the top of the car, he will then use the lever O which extends up to the top of the car.

By reason of the slotted links attached to the ends of the levers, and movable upon the pin $a$ it is possible to operate either of the levers independently of the other, while each of them is allowed sufficient movement to accommodate itself to the movement of the other lever.

If desired, the levers may be retained in their normal position by a spring or by sufficiently weighting the outer end of the lever L.

Having thus described my invention, what I claim as new, and desire to secure by Letters Patent, is—

A car coupling consisting of levers fulcrumed to swing in a horizontal plane about the central line of the draw-bar, jaws formed in the meeting faces of said levers to grasp the head of the coupling bar, and vertically swinging locking levers whereby the jaws are retained in a closed position, or by which the jaws may be thrown open at will, in combination with horizontal and vertical hand levers fulcrumed to the car having the curved slotted links formed at their inner ends, a connecting rod extending upward from the rear of the locking levers and having a pin extending through the links of the two hand levers whereby either of said levers may be actuated independently of the other, substantially as herein described.

In witness whereof I have hereunto set my hand.

FRANK M. RYAN.

Witnesses:
  S. H. NOURSE,
  LEE D. CRAIG.